United States Patent
Nazarian

(10) Patent No.: US 7,549,807 B2
(45) Date of Patent: Jun. 23, 2009

(54) CAMERA BRACKET

(76) Inventor: Nazareth Nazarian, 44 Beverly Pl., Bergenfield, NJ (US) 07621-1106

( * ) Notice: Subject to any disclaimer, the term of this patent is extended or adjusted under 35 U.S.C. 154(b) by 322 days.

(21) Appl. No.: 11/728,308

(22) Filed: Mar. 26, 2007

(65) Prior Publication Data

US 2008/0240705 A1    Oct. 2, 2008

(51) Int. Cl.
*G03B 17/00* (2006.01)
(52) U.S. Cl. .................. 396/420; 396/422; 348/373
(58) Field of Classification Search ........... 396/420, 396/422, 428; 348/373
See application file for complete search history.

(56) References Cited

U.S. PATENT DOCUMENTS

| | | | |
|---|---|---|---|
| 4,530,584 A * | 7/1985 | Schmidt | 396/428 |
| 5,752,113 A * | 5/1998 | Borden | 396/428 |
| 6,042,277 A | 3/2000 | Errington | |
| 6,354,544 B1 | 3/2002 | Muzila | |
| 6,663,299 B1 | 12/2003 | Shupak | |
| 6,776,539 B2 | 8/2004 | Mulcahey | |
| 6,991,384 B1 * | 1/2006 | Davis | 396/428 |
| 2003/0128975 A1 * | 7/2003 | Shevick | 396/428 |
| 2005/0213959 A1 * | 9/2005 | Chiang | 396/428 |
| 2007/0160364 A1 * | 7/2007 | Peika | 396/428 |

OTHER PUBLICATIONS

Argraph Corp., internet website www.argraph.com, Samigon V-H Flip Bracket Systems-TM (copy attached).

* cited by examiner

*Primary Examiner*—W. B. Perkey
*Assistant Examiner*—Linda B Smith
(74) *Attorney, Agent, or Firm*—Gallo & Darmanian LLP; Nicholas A. Gallo

(57) ABSTRACT

A camera bracket is disclosed which facilitates movement of a camera and its field from the horizontal to the vertical position and maintains the center of the camera lens in exactly the same in relationship to all objects, such as the sun, as long as the photographer does not change position and which maintains the center of the camera lens in the exact same position with respect to any flash that is being used even if the photographer does change position.

19 Claims, 10 Drawing Sheets

FIG. 6
FIG. 7
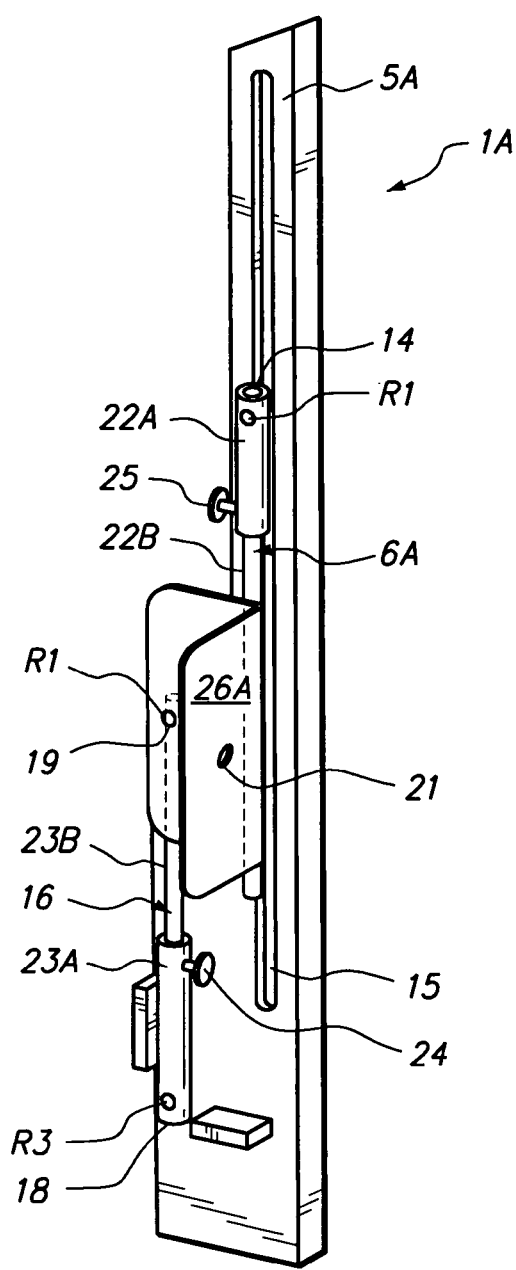
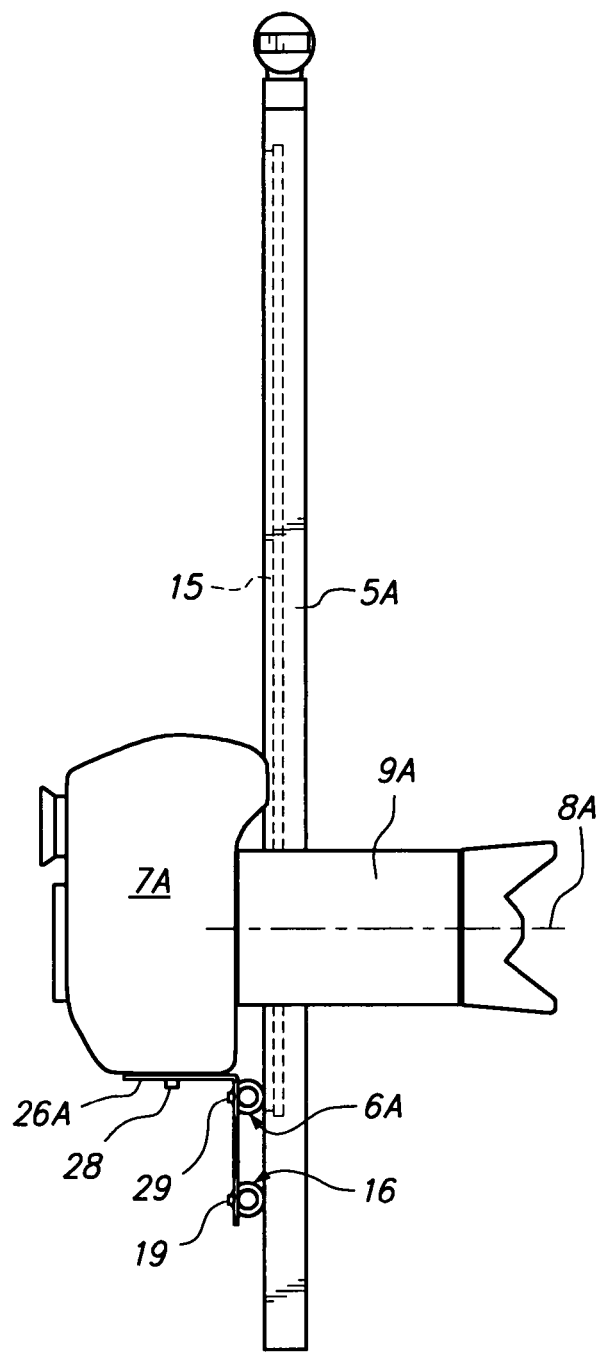

CAMERA BRACKET

BACKGROUND OF THE INVENTION

Serious photographers need a holder for their camera—a camera bracket—that enables a quick repositioning of the camera field from a horizontal to a vertical position without the photographer moving his or her stance or location.

It is important that the horizontal orientation between the flash and the camera lens does not change. For example, if the center of the lens when the camera is used for horizontal photographs is aligned horizontally with the center of the flash, then when shifting to vertical photographs the center of the camera lens should still be aligned horizontally with the center of the flash. Such devices appear to exist and seem to be represented by the Samigon V-H Flip Bracket, now commercially available at the B&H chain in New York City, and by the camera brackets disclosed in U.S. Pat. Nos. 6,354,544 and 6,663,299. In order to view the Samigon V-H Flip Bracket, access www.argraph.com and click on that product.

While those brackets accomplish their noted objective, they do not fully meet the objective that until now was only dreamed about by the most serious photographers. The ideal bracket would provide not only for the horizontal orientation between the flash and the center of the camera lens to be the same in both positions but the vertical orientation to be exactly the same as well. In other words, the center of the lens should not move at all. Ideally this would also be so universally, that is, with all cameras.

BRIEF DESCRIPTION OF THE INVENTION

By constructing a camera bracket for which various specific angular, alignment and other relationships of the various members and components are maintained, the camera bracket functions so that it is capable of maintaining the center of the camera lens in exactly the same position with respect to pertinent points such as a flash or the sun when the camera field is switched from horizontal to vertical or vice versa.

BRIEF DESCRIPTION OF THE DRAWINGS

FIGS. 5 and 6 are frontal views in perspective of a camera bracket of this invention in the horizontal and vertical positions, respectively, as with FIGS. 3 and 4, but eliminating ancillary photography elements and the lines that define the referenced angular and alignment relationships.

FIG. 7 is a side view of a camera bracket of this invention with a camera mounted on it.

DETAILED DESCRIPTION OF THE INVENTION

Figure 1:
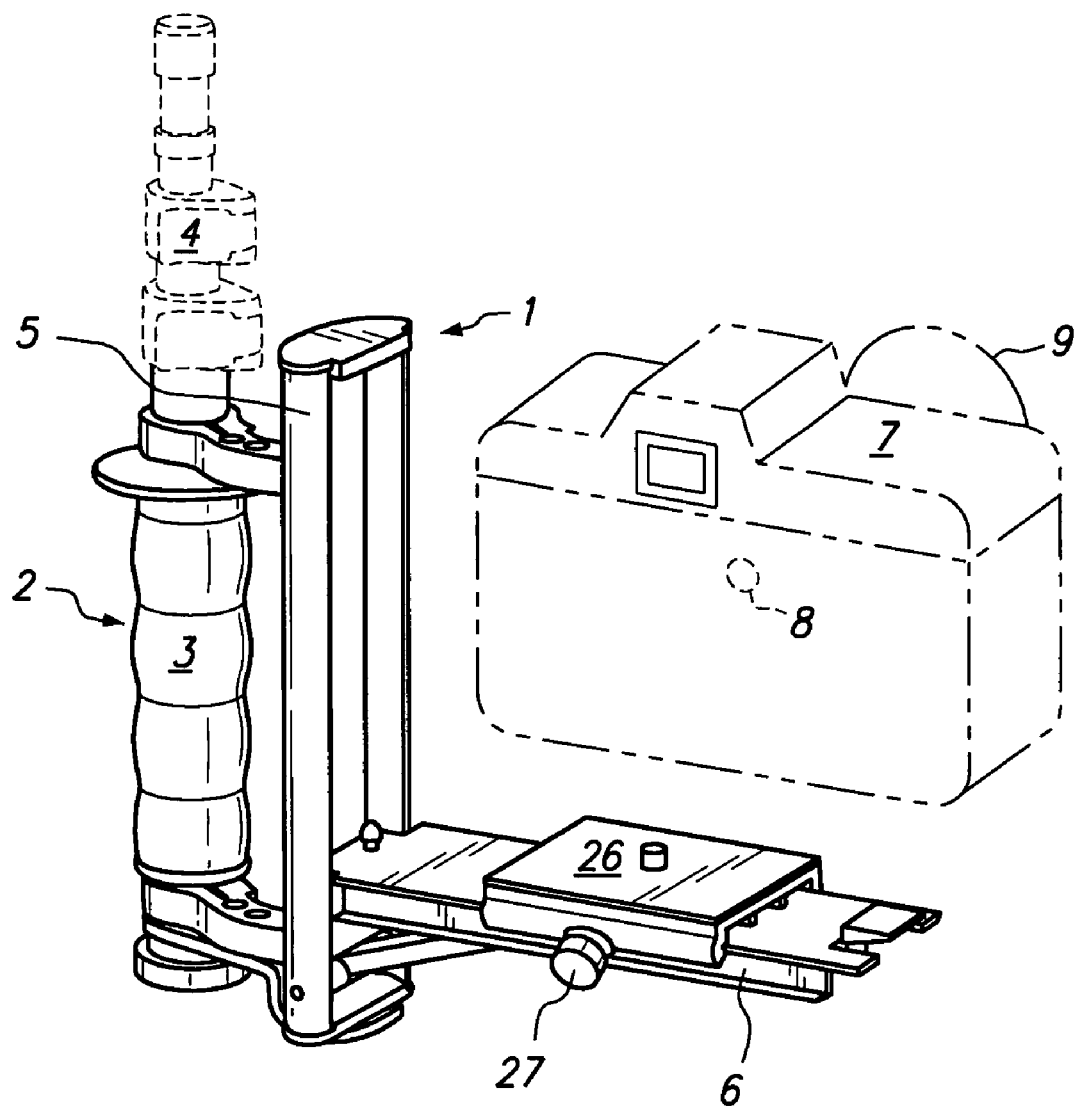
FIGS. 1 and 2 are frontal views in perspective of a prior art camera bracket in the horizontal and vertical positions, respectively.
Figure 2:
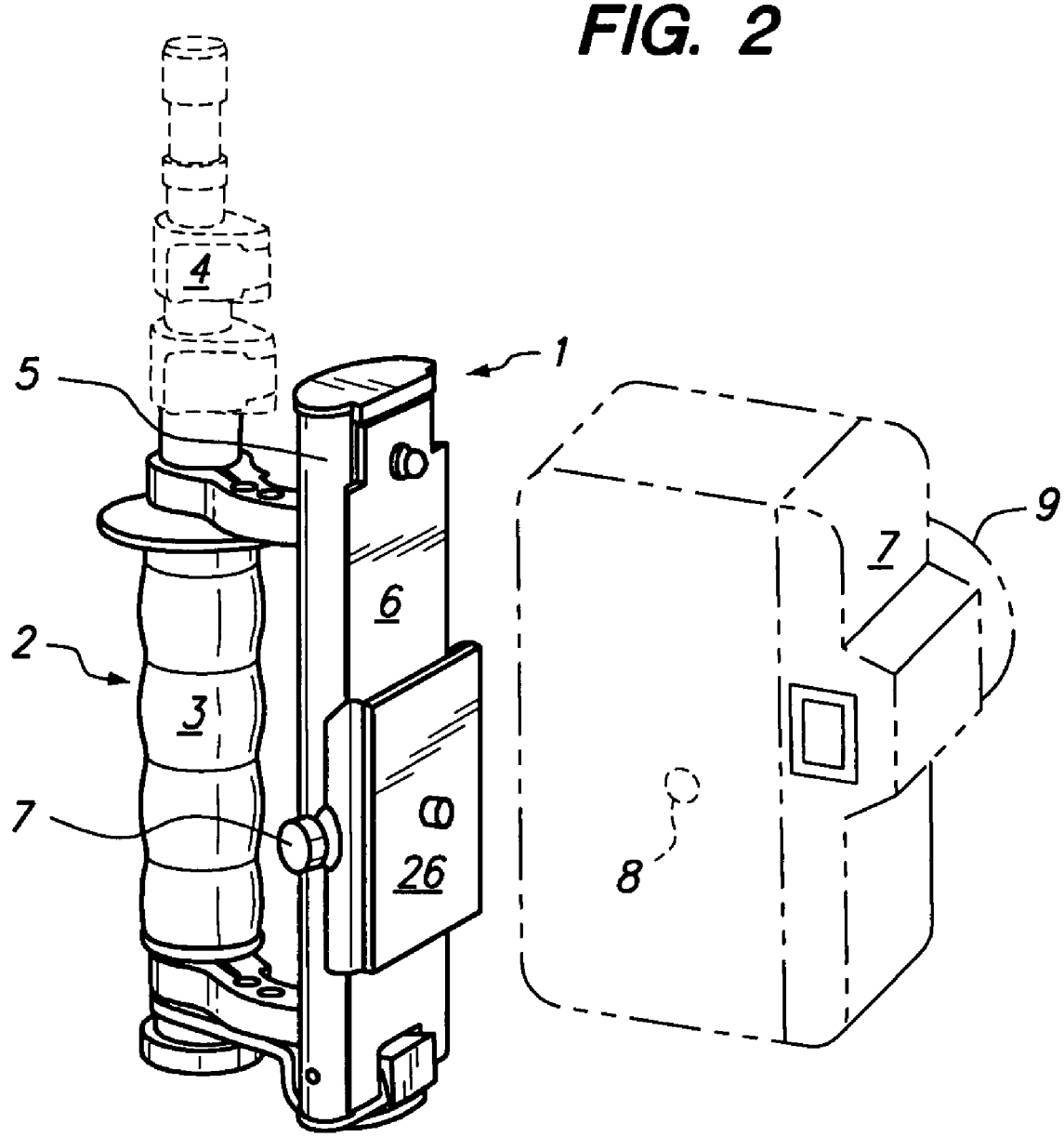

FIGS. 1 and 2, both frontal views in perspective, illustrate an existing prior art bracket, 1. Although not strictly necessary, but as is usually the case, the bracket has ancillary vertical member, 2, which has several functions. As shown, it has a means, 3, for the user to hold the bracket and it holds the flash, 4, the latter usually being vertically and horizontally adjustable. There is a vertical base member, 5, to which the mechanism needed to switch the camera field from horizontal to vertical is attached. The ancillary member is also attached to the base.

There is a member, 6, as shown most clearly in FIG. 1, that supports a mount, 26, to which, in turn a camera, 7, can be attached. The mount as shown is slidable along the support, 6, and can be fixed in a particular position by a screw, 27. As shown, the camera field would have a horizontal orientation. This support, 6, becomes vertically disposed, as shown in FIG. 2, when the camera field is to have a vertical orientation.

As stated above, FIG. 1 illustrates the orientation of a camera lens, 9, with respect to the flash, 4, when a camera, 7, is attached and used for taking horizontal photographs and FIG. 2 illustrates the orientation of the camera lens, 9, with respect to the flash, 4, when an attached camera, 7, is used for taking vertical photographs. The lens, 9, is shown only partially as it is on the opposite side of the camera, 7, from the side primarily shown. The dotted circle, 8, is the center point of lens, 9, projected through the camera, 7, for purposes of illustration.

As is observable from FIGS. 1 and 2, in both positions the orientation horizontally of the camera lens, 9, with respect to the flash, 4, is the same. It is also observable from FIGS. 1 and 2 that the orientation vertically of the camera lens, 9, with respect to the flash, 4, is not the same. This is the deficiency of that prior art camera bracket.

Figure 3:
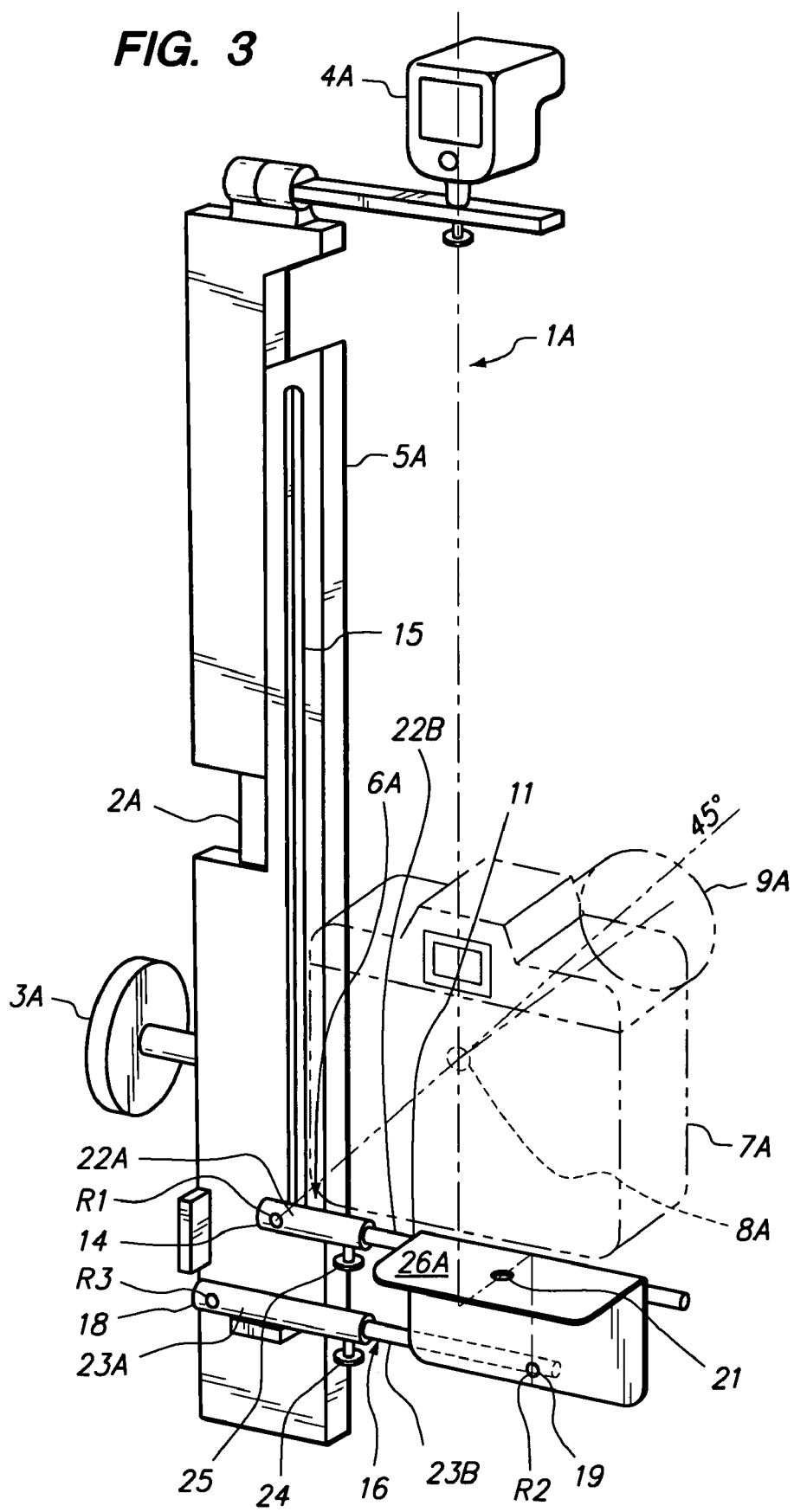
FIGS. 3 and 4 are frontal views in perspective of a camera bracket of this invention in the horizontal and vertical positions, respectively, including, for orientation purposes, various ancillary photography elements that do not constitute part of the camera bracket of this invention, as well as lines that assist the reader to define the required angular and alignment relationships of the various components extant in the camera bracket of this invention.
Figure 4:
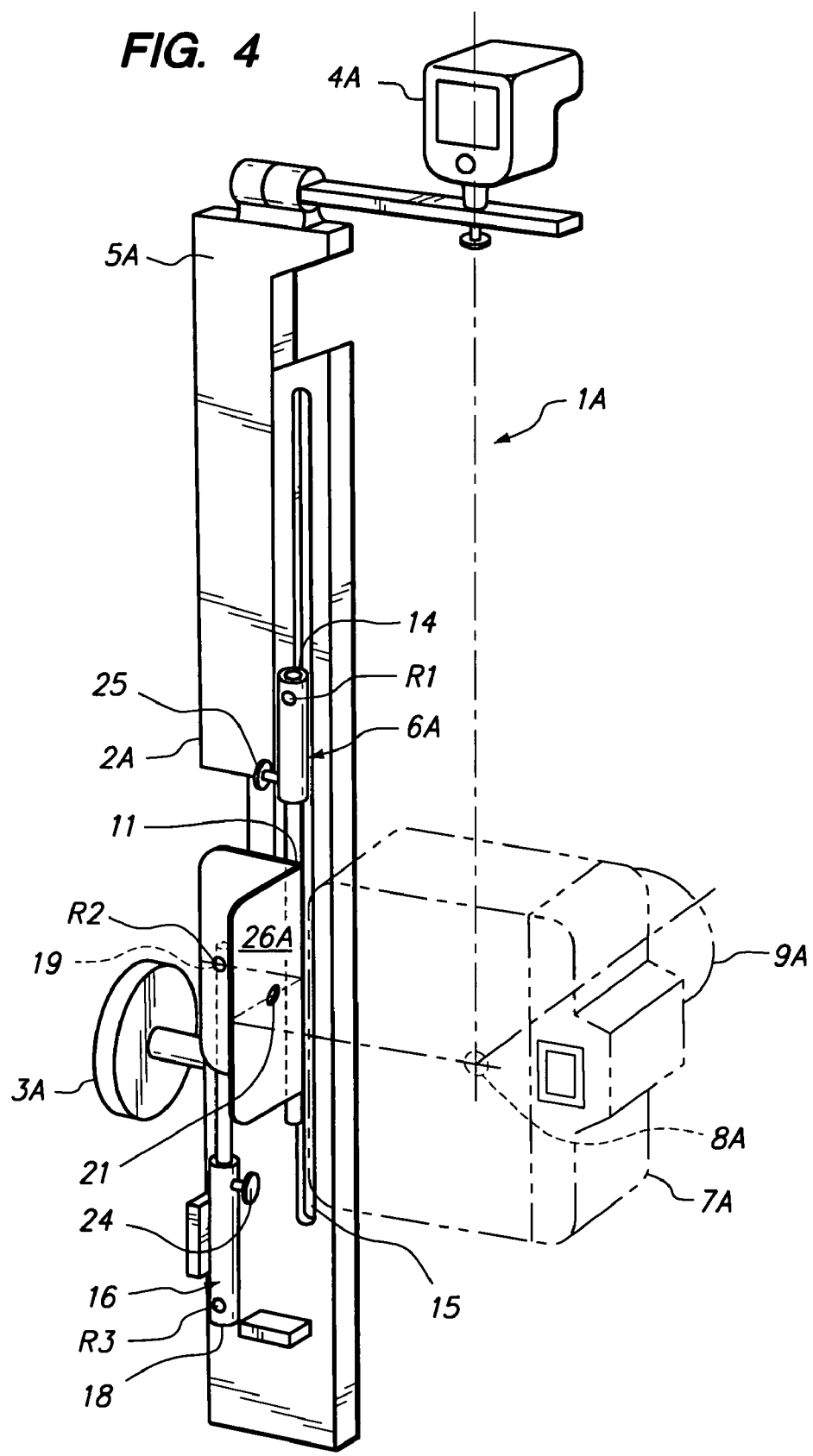

FIGS. 3 and 4, also both frontal views in perspective, illustrate a camera bracket, 1A, of this invention. It has an ancillary vertical member, 2A, having a grip, 3A, and which holds a flash, 4A. As shown, the flash, 4A, is vertically and horizontally adjustable. It has a vertical base member, 5A, to which is attached the mechanism required to switch the camera field from a horizontal position to a vertical position and the ancillary vertical member.

There is a member, 6A, which supports a mount, 26A, which holds a camera, 7A, when it is attached to the bracket. As shown in FIG. 3 the camera field is in the horizontal position and thus support 6A is in the horizontal position. As shown in FIG. 4, this support, 6A, becomes vertically disposed when the camera field is in a vertical position.

FIG. 3 illustrates the position of a camera lens, 9A, with respect to flash 4A when the bracket is being used for the taking of horizontal photographs. FIG. 4 illustrates the position of a camera lens, 9A, with respect to the flash, 4A, when the bracket, 1A, is being used for taking vertical photographs. The dotted area 8A shows the center of the camera lens, 9A projected through the camera, 7A. As is shown, the camera lens, 9A, has not changed either horizontally or vertically with respect to the flash, 4A. In other words, the position of the camera lens, 9A, has not changed in any direction. This would be the case independent of the vertical or horizontal position of the flash. In fact there is no need to center the flash or to have any flash at all.

The camera mount, 26A, must have means by which the camera can be attached to it. A professional photographer wants an attachment that is truly fixed without a chance of movement if the attachment is not tight. Thus the attachment of the camera to the mount is preferably via a hole, 21. A nut and bolt mechanism may be utilized.

The most important structural aspects of the camera bracket of this invention, shown in FIGS. 3 and 4, is the positioning of three points of rotation. Referring to FIG. 3, these are:

(a) A point of rotation, R1, of the support, 6A, is secured at one end, 11, in fixed position to the camera mount, 26A, but which at a point, 14, near its opposite end is rotatably mounted and vertically movable in a groove or the like, 15, disposed vertically in or on the base, 5A. The groove may be a shallow trough, as shown, or the groove may actually be a slot or the like passing through the base 5A.

(b) A point of rotation, R2, of a link member, 16, rotatably attached to the camera mount, 26A, at a point, 19, on the camera mount below support 6A.

(c) A second point of rotation, R3, of that same link, 16, which second point of rotation, R3, is near the opposite end, 18, of the link, 16, where it is attached rotatably to the base below and distal from the point of rotation, R1, of the support, 6A, that is fixed to the camera mount, 26A.

Figure 10:
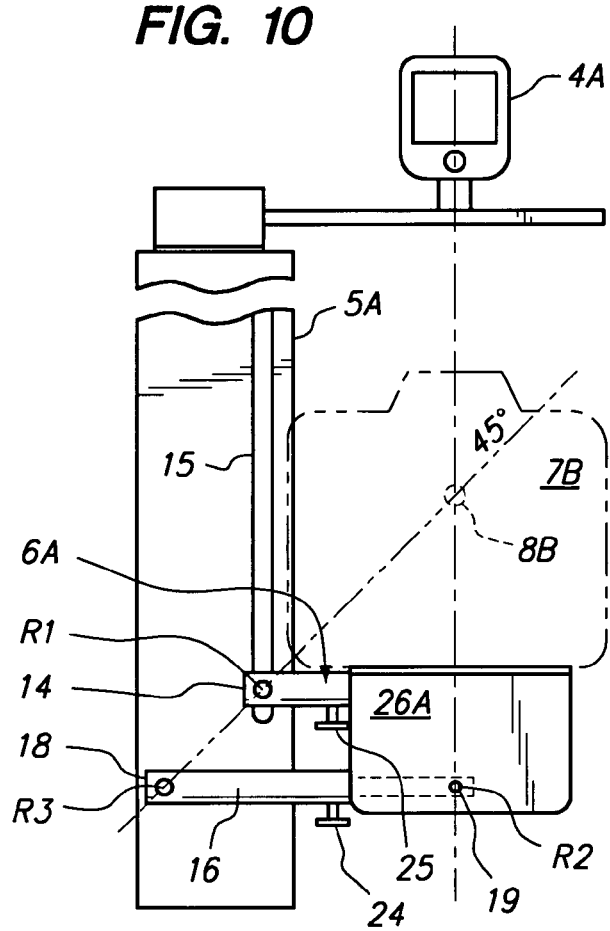
FIG. 10 is a front view of a portion of a camera bracket of this invention illustrating the relationship of a particular camera to various components of the camera bracket when that camera is to be used.
Figure 11:
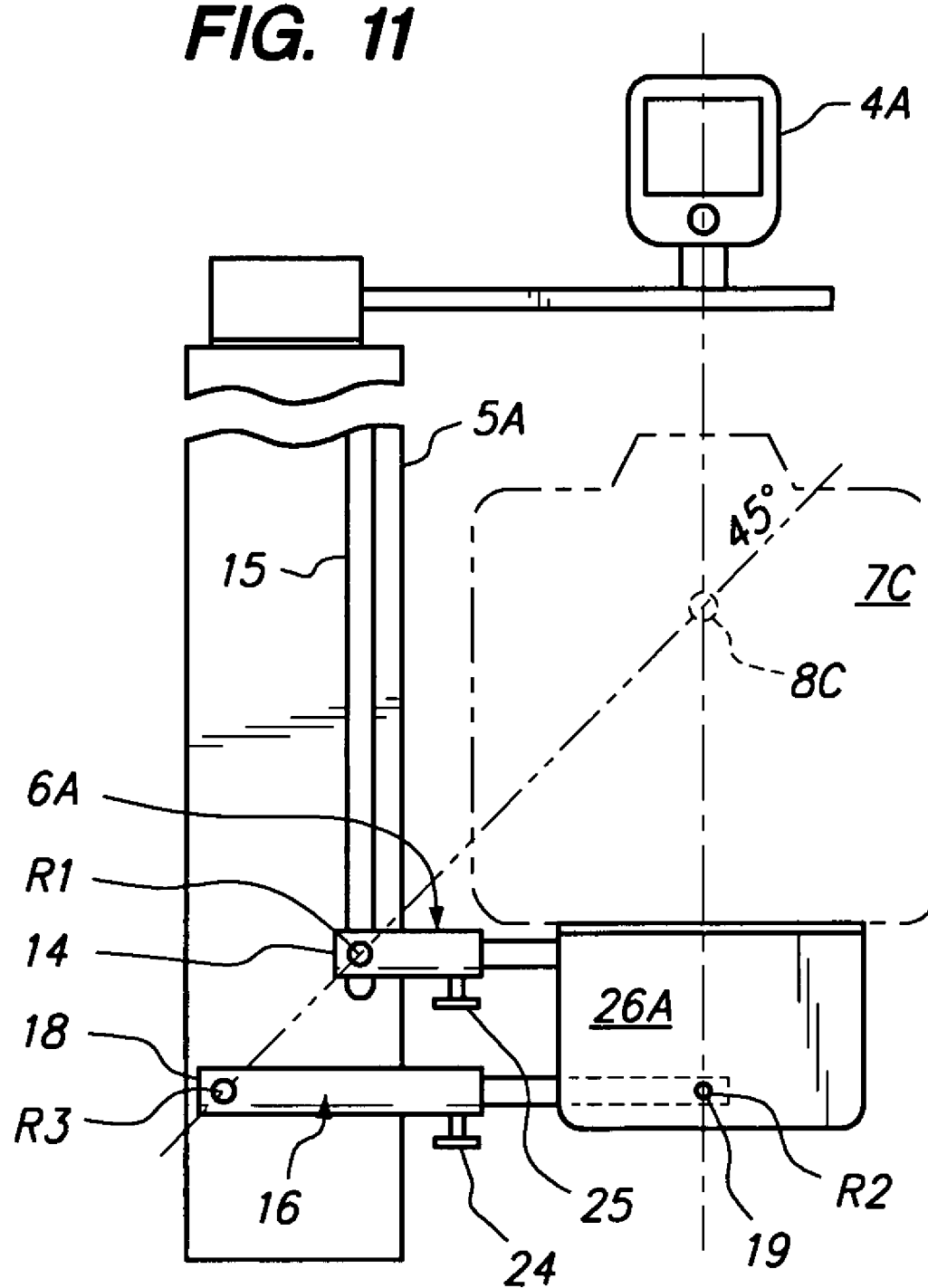
FIG. 11 is a front view of a portion of a camera bracket of this invention illustrating the relationship of another particular camera to various components of the camera bracket when that camera is to be used.

(d) An imaginary line drawn through point of rotation R1, and point of rotation R3, when the camera is in a horizontal position forms a 45 degree angle with respect to both horizontal and vertical and also passes through the center point of the camera lens. As most clearly shown in FIGS. 10 and 11, in order to accomplish the above, the mount, 26A, will have to be adjusted longitudinally until the 45 degree imaginary line passes through the center point of the camera lens. FIGS. 10 and 11 are frontal views of two different cameras to be attached to the camera mount.

As shown most clearly in FIG. 3, and as more completely described below, this is accomplished through making support, 6A, and link 16, adjustable in length. However, other means can be used as long as the required relationship of the various members is as described.

Figure 5:
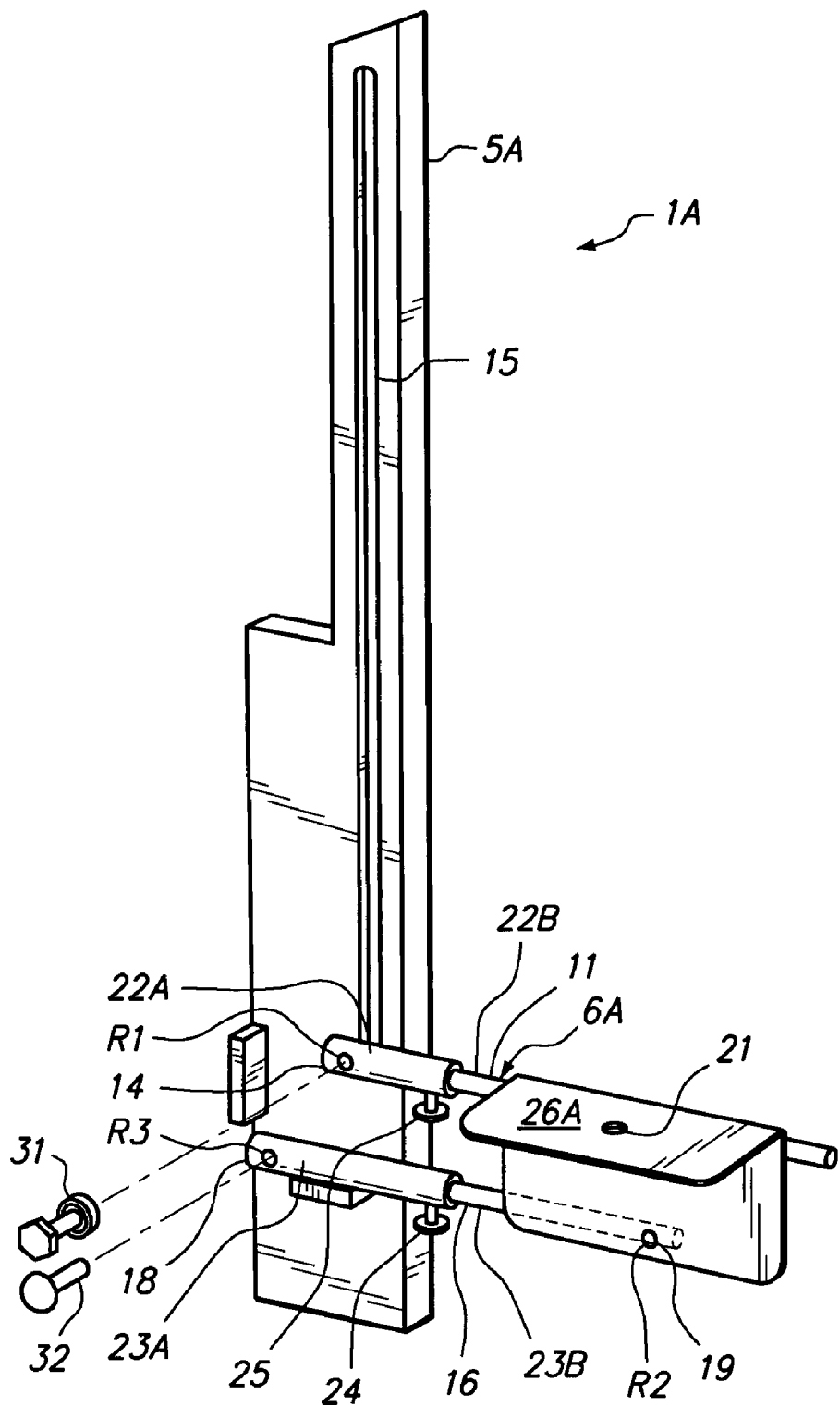

(e) The support, 6A, and link 16, must be parallel to each other both when the camera mount is in the horizontal and in the vertical position. This is shown in FIGS. 3 and 4. This is also shown, more clearly, in FIGS. 5 and 6. FIGS. 5 and 6 present the same view as FIGS. 3 and 4, but certain ancillary components shown in FIGS. 3 and 4 but not essential to the bracket of this invention have been eliminated, as have the lines illustrating the alignment of the various points of rotation.

(f) The support, 6A, and link 16, must be the same distance apart when in both the vertical and horizontal position. This is also shown clearly not only in FIGS. 3 and 4 but also in FIGS. 5 and 6.

(g) The support, 6A, and link 16, must be in the same plane when in both the horizontal and vertical position for the embodiment of the camera bracket of this invention shown in FIGS. 1 through 6. This is shown most clearly in FIGS. 7 and 8, which figures are opposing side views of the bracket. As a result of the relationships described, if support 6A and link 16 are in the same plane in the horizontal position, as shown most clearly in FIGS. 7 and 8, they will be in the same plane when in the vertical position.

(h) The center point, 8, of the camera lens, 9, must coincide vertically with point of rotation R2.

These relationships represent the core of the invention. These relationships allow this bracket to function as described. The member referred to as a "link" is a connecting member that can be of any shape, height or width as long as the various relationships set forth above are maintained.

In order to shift the camera field from the horizontal to the vertical position, the user pulls upward slightly the camera, 7A, or the camera mount, 26A, while pushing lightly towards the base, 5A. In order to do the reverse, that is to shift the camera field from the vertical to the horizontal position, the user pulls the camera, 7A, lightly away from the base, 5A, while pushing downward slightly on the camera, 7A, or the camera mount, 26A.

To accommodate various cameras and to render the performance described universal for all cameras, the camera position must be adjustable longitudinally relative to point of rotation R1 when positioned for horizontal photographs. In the preferred embodiment, this is accomplished by making support, 6A, and link 16 adjustable longitudinally. In the embodiment shown, this is accomplished by the use of two sections, 22A and 22B, and 23A and 23B, one fitting slidably within the other and the position of the slidable portions of each member being secured as shown by a screw fitting, 24 and 25. Each of the support, 6A, and link 16 is adjusted by the same distance when the camera mount is adjusted for the various cameras.

As is previously stated, FIG. 3 shows a camera bracket of this invention when the camera, 7A, is in the horizontal position while FIG. 4 shows the bracket in the vertical position. The support, 6A, previously in a horizontal position is now in a vertical position as is link 16, also previously in a horizontal position.

In order to move from the horizontal to the vertical position, support 6A must slide upward. To make this possible, in the embodiment shown, support 6A slides within a groove or the like, 15, in the external wall of base 5A, in which case rotatable link 16 must also be attached to the external wall of base 5A as shown.

As previously noted, FIG. 7 is a side view of a bracket of this invention with a camera attached to it. It is in the horizontal orientation as shown in FIG. 3. It faces from the position of the camera toward base 5A. The camera, 7A, is to be attached to mount, 26A, via a nut and bolt combination, 28. Support 6A is shown attached to the mount, 26A, in fixed position via a screw, 29. Link 16, is shown attached rotationally to the mount, 26A, via a typical bolt and double nut pivot, 19. The camera lens, 9A, is shown for purposes of orientation. Since the view is towards the base, 5A, groove 15, in which support 6A slides, is shown by dotted lines.

Figure 8:
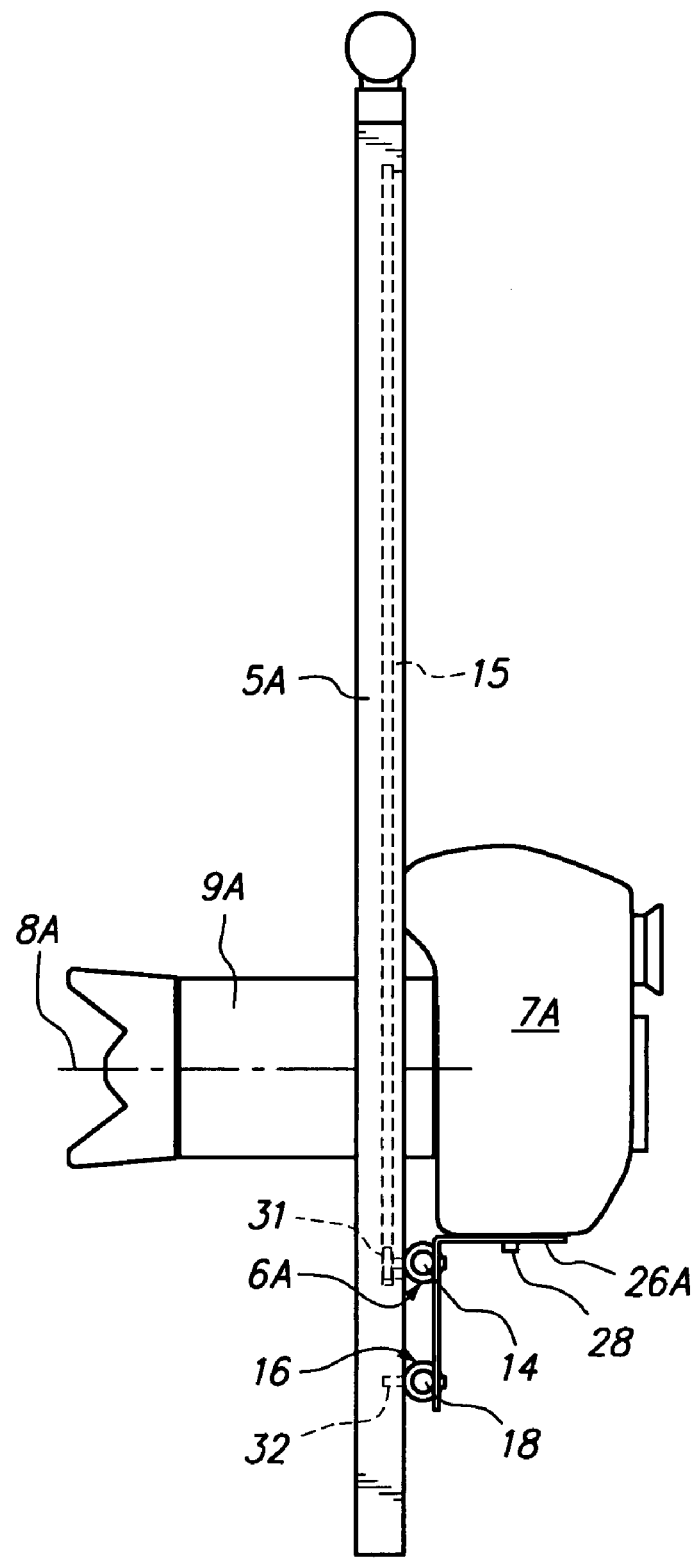
FIG. 8 is a side view of the camera bracket shown in FIG. 7, rotated 180 degrees.

FIG. 8 is a side view rotated 180 degrees from FIG. 7. The handle and the member holding the flash are removed. Camera, 7A, and its lens, 9A, are shown for orientation. Support 6A is shown attached to a bearing 31 which is situated the groove 15, shown by dotted lines, of base 5A. Link 16 is shown rotationally mounted via a pivot, 32, to base 5A.

The exact positioning of the camera on the mount is dependent on the position of the lens on the camera. This is best shown in FIG. 10 compared to FIG. 11. Both Figures are frontal views of a portion of the bracket. FIG. 10 is a diagrammatic presentation of a camera, 7B, similar to the Nikon D1X camera, available in any serious camera shop, such as in the B&H chain in New York City. In the camera shown, the center point, 8B of the lens is 88 mm from the bottom of the camera and thus the camera must be oriented on the mount so that the lens is 88 mm from the pivot point, R1, of support 6A in groove 15. This can be accomplished by loosening nuts, 24 and 25, of support 6A and link 16 and sliding those members to the left until the lens is positioned as noted above. The nuts are then tightened. If so positioned, the imaginary line drawn through pivot points R1 and R3 and the center of the lens will be at 45 degrees.

FIG. 11 shows the orientation of a camera, 7C, similar to the Nikon D705 camera, also available from B&H. As shown, the camera lens is 53 mm from its bottom and thus the center point, 8C, of the lens must be 53 mm from the pivot point, R1, of support 6A in groove 15. This adjustment is made in the same manner as with a camera similar to the Nikon DIX.

The manner of positioning most cameras is done in a similar way. For example, a camera similar to the Bronica 645 is positioned with the center point of the lens 48 mm from pivot point R1, of support 6A because the center of the lens is 48 mm above the camera bottom. For a camera similar to the Mamiya RB 67, the center point of the camera lens is positioned 53 mm from pivot point R1, and for a camera similar to the Nikon 35 mm, the center point of the camera lens is positioned 38 mm from pivot point R1.

Figure 9:
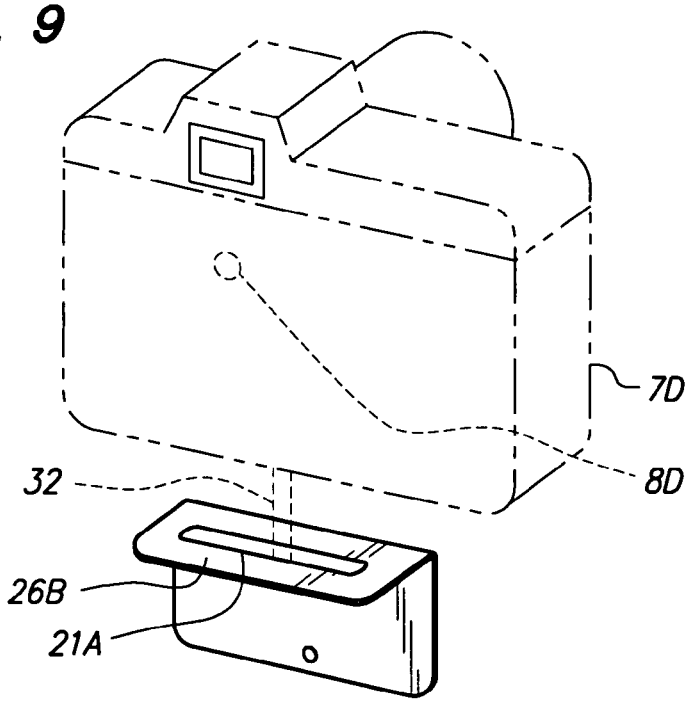
FIG. 9 is a frontal view in perspective of an alternate mount on which a camera can be mounted on a camera bracket of this invention and illustrates a particular camera that would advantageously utilize such a mount.

For some few cameras, as with the type shown in FIG. 9, an additional adjustment may be necessary because the lens is not horizontally centered and/or the point of attachment of the camera to the mount is not horizontally centered. It is important that the center point of the lens coincide horizontally with the point of rotation R2. In the embodiment of the camera mount shown in FIG. 9, the mount, shown in frontal perspective, has a horizontal slot, 21B. This facilitates such an additional adjustment.

Camera 7D shown in FIG. 9 is similar to the Olympus Camedia D-560. It is shown in the process of being attached to the mount, 26B. The lens, 9D, is not horizontally centered. Furthermore, the bolt, 32, that is attached in fixed position to the camera, and which will also attach to the mount, is not horizontally centered nor does it coincide horizontally with the center point, 8D, of the lens. The position of the camera lens relative to point of rotation R2 can be adjusted by moving the camera attachment bolt in slot 21B. For the camera shown, the lens is 30 mm from the bottom of the camera, 20 mm from one end of the camera and 80 mm from the opposite end of the camera. The fixed point of attachment to the mount is 45 mm from one end of the camera and 55 mm from the opposite end of the camera.

There are, of course, many possible embodiments of the camera bracket of this invention. The only limitations are the relationships (a) through (h) described earlier.

Any camera can be used. The only difference will be the position of the camera on the camera mount and the distance of point of rotation R1 from point of rotation R3.

Any sturdy material can be used for the various components of the bracket, whether plastic, metal, etc. Any means of rotationally attaching various members to others can be used.

In the preferred embodiment shown in FIGS. 3 and 4, base 5A is 45 cm long. The groove, 15, in which member 6A slides is 28 cm long and 10 mm wide and is positioned 3.5 cm from point of rotation R3. The center lines of support 6A and link 16 are 3 cm apart. Point of rotation R2 is 12.5 cm from point of rotation R3. Point of rotation R2 is longitudinally in the center of the mount, which in turn is 80 mm long. Longitudinally, point of rotation R1 is 80 mm from point of rotation R2. The specific measurements are not important as long as the relationships disclosed earlier are maintained.

Figure 12:
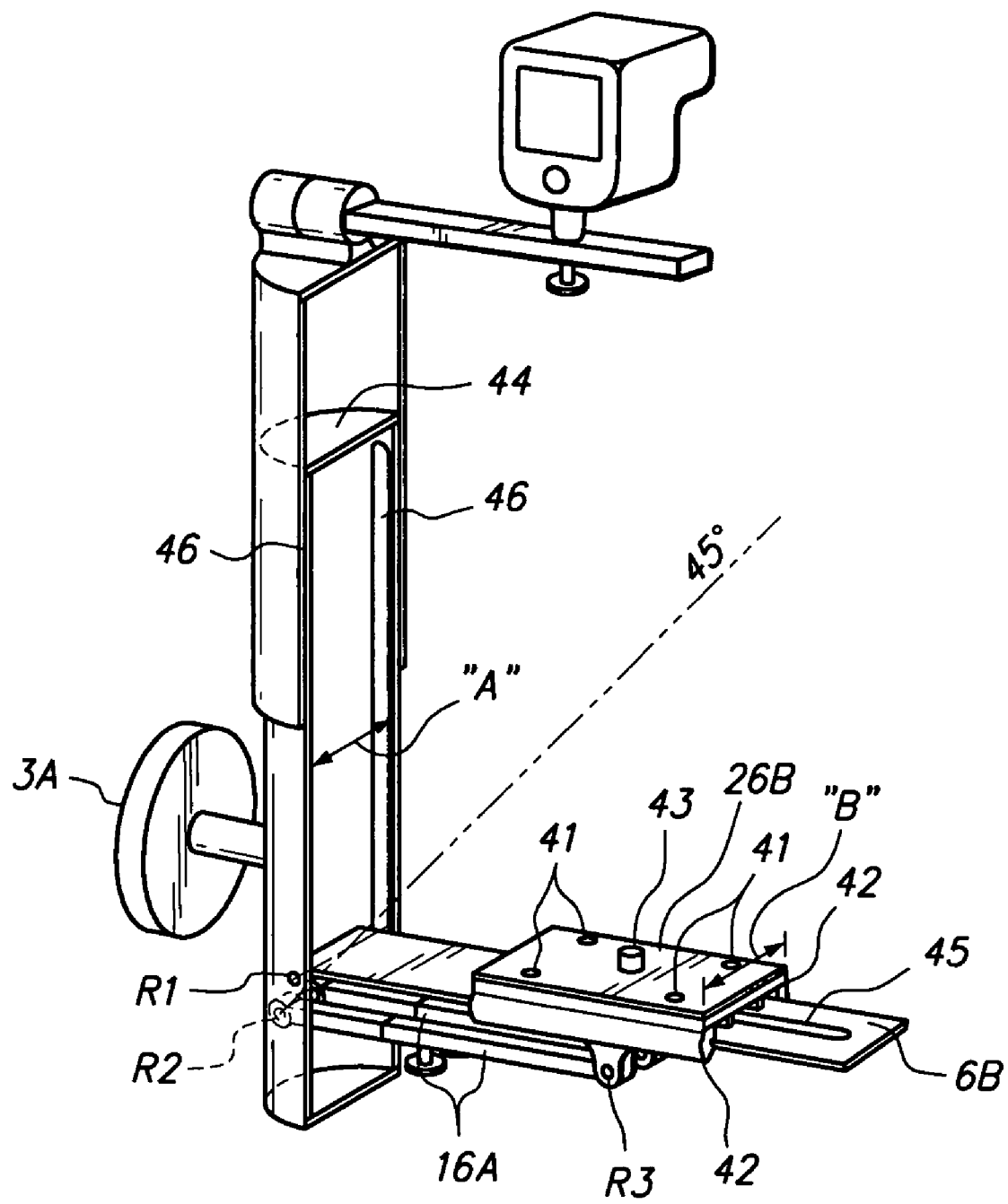
FIG. 12 is a frontal view in perspective of another embodiment of the camera bracket of this invention.

Such an adjustment of the distance between the camera mount and point of rotation R1 can also be made possible if the camera mount itself is horizontally adjustable along its support. A means for doing that is incorporated into an embodiment of this invention shown in FIG. 12. In FIG. 12 the camera bracket is shown in frontal perspective. Camera mount 26B can slide longitudinally along support 6B and is held in place generally on support 6B by lips, 42, and in a specific location by screws 41. In such event, when the mount is moved longitudinally the length of link 16A must be adjusted via the means previously described.

The camera bracket of FIG. 12 comprises all the basic components of the preferred embodiment shown in FIGS. 3 and 4, et sec—a base, 44, a support 6B and link 16B, as well as a camera mount 26B. All of the required relationships set forth earlier are maintained. In this embodiment, base, 44, has a recess in the wall facing the camera. The points of rotation, R1 and R2 are located inside the recess in base 44. Support 6B, slides vertically in grooves 46 disposed just inside the recess in base 44. The width, B, of camera mount 26B, is preferably less than the internal width, A, of base 44. Thus when not in use the camera mount can be moved to a vertical position resulting in a compact unit for transportation or storage.

As stated earlier, the invention described herein will fulfill the serious photographer's objective of switching the camera from a horizontal field to a vertical field without changing the position of the camera lens at all with respect to the flash or the sun and to use the same bracket to accomplish this for all cameras. The camera bracket of this invention exceeds significantly the performance of prior art camera brackets in general and the specific prior art camera bracket described herein and shown in FIGS. 1 and 2. It is possible that some serious photographers can tolerate some small change in the position of the camera lens when switching from a horizontal to a vertical field. Even that capability would be an advance over prior art camera brackets. This could be achieved if the configurations and relationships described for the various components are in turn not exactly met but only essentially met. The invention claimed includes such embodiments.

What is claimed is:

1. A camera bracket comprising:
   a vertical base member,
   a rotatable support member and a rotatable link member both of which can assume essentially a horizontal and essentially a vertical position,
   said link being rotationally engaged near a first end with a member having means for mounting a camera and rotatably engaged near a second end with said base,
   said support being engaged near a first end in essentially a fixed position with said camera mount and engaged near a second end rotationally and slideably with said base,
   said link and said support being essentially parallel to each other when essentially disposed in a horizontal position and when disposed in essentially a vertical position,
   the distance between said link and said support being essentially the same when said link and said support are disposed essentially in a horizontal position and when said support and said link are disposed in essentially a vertical position,
   the distance between said mount and said base being adjustable longitudinally when said support is disposed in essentially a horizontal position, thus facilitating the mounting of a camera so that the center point of the camera lens coincides essentially vertically with said point of rotational engagement of said support with said mount, said link being adjustable lengthwise with respect to said base essentially equidistant with the longitudinal movement of said mount with respect to said base, the link being engaged rotatably to said base at a point distal from and below the point of engagement of said support with said base by distances that result in an imaginary line projected through said point of engagement of said support with said base, said point of engagement of said link with said base and essentially the center point of a camera lens, when said support and said link are disposed in essentially a horizontal position, assumes an angle approaching essentially 45 degrees with respect to the vertical and horizontal, said distance between said mount and said base and said link and said base being adjustable lengthwise so that the said imaginary line passes through the center of said camera lens, said means of rotational and slidable engagement of said support with said base being a sufficient length so that said support and said link are able to assume essentially a vertical position, whereby there exists a camera bracket which presents a camera lens in essentially the same position with regard to a fixed point when the mount is disposed in essentially a vertical position or a horizontal position and when the user remains in a fixed position.

2. A camera bracket comprising:

a vertical base member, a rotatable support member and a rotatable link member both of which can assume a horizontal and a vertical position, said link being rotationally engaged near a first end with a member having means for mounting a camera and rotationally engaged near a second end with said base, said support being engaged near a first end in a fixed position with said camera mount and engaged near a second end rotationally and slideably with said base, said link and said support being parallel to each other when disposed in a horizontal position and when disposed in a vertical position, the distance between said link and said support being the same when said link and said support are disposed in a horizontal position and when said link and said support are disposed in a vertical position, said mount being adjustable longitudinally with respect to said base when said support is disposed in a horizontal position, thus facilitating the mounting of a camera so that the center of the camera lens coincides vertically with said point of rotational engagement of said support with said mount, said link being adjustable lengthwise with respect to said base equidistant with the longitudinal movement of said mount with respect to said base, said link being engaged to said base at a point distal from and below the point of engagement of said support with said base by distances that result in an imaginary line projected through said point of engagement of said support with said base, said point of engagement of said link with said base and said center of said camera lens when said support and said link are disposed in a horizontal position assumes an angle approaching 45 degrees with respect to the vertical and horizontal, said distance between said mount and said base and said link and said base being adjustable lengthwise so that the said imaginary line passes through the center of the camera lens, said means of rotational and slidable engagement of said support with said base being slidable a sufficient length so that said support and said link are able to assume a vertical position, whereby there exists a camera bracket which presents a camera lens in the same position with regard to a fixed point when the mount is disposed in a vertical position or a horizontal position and when the user remains in a fixed position.

3. The camera bracket of claim 1 wherein the mount is slideably engaged with the support whereby said distance between said mount and said base may be adjusted by sliding said mount along said support and adjusting the length of said link.

4. The camera bracket of claim 2 wherein the mount is slideably engaged with the support whereby said distance between said mount and said base may be adjusted by sliding said mount along said support and adjusting the length of said link.

5. The camera bracket of claim 1 wherein the support is adjustable in length, whereby said distance between said mount and said base is adjustable by adjusting the length of said support and of said link.

6. The camera bracket of claim 2 wherein the support is adjustable in length, whereby said distance between said mount and said base is adjustable by adjusting the length of said support and of said link.

7. The camera bracket of claim 1 wherein said mount is slidingly engaged with said support and wherein said support is adjustable in length whereby said distance between said mount and said base is adjustable by at least one of: sliding said mount along said support and adjusting the length of said link, adjusting the length of said support and said link, and both sliding said mount along said support and adjusting said length of said support and said link.

8. The camera bracket of claim 2 wherein said mount is slidingly engaged with said support and wherein said support is adjustable in length whereby said distance between said mount and said base may be adjustable by one of: sliding the mount along said support and adjusting the length of said link, adjusting the length of said support and said link and both sliding the mount along said support and adjusting said the length of said support and said link.

9. The camera bracket of claim 3 wherein said mount includes means for mounting a camera at a multiplicity of points longitudinally of said mount.

10. The camera bracket of claim 4 wherein said mount includes means for mounting a camera at a multiplicity of points longitudinally of said mount.

11. The camera bracket of claim 5 wherein said mount includes means for mounting a camera at a multiplicity of points longitudinally of said mount.

12. The camera bracket of claim 6 wherein the mount includes means for mounting a camera at a multiplicity of points longitudinally of said mount.

13. The camera bracket claim 7 wherein the mount includes means for mounting a camera at a multiplicity of points longitudinally of said mount.

14. The camera bracket of claim 8 wherein the mount includes means for mounting a camera at a multiplicity of points longitudinally of said mount.

15. The camera bracket of claim 1 wherein said second end of each of said support and of said link are engaged with said base on an outside surface of said base.

16. The camera bracket of claim 2 wherein said second end of each of said support and said link are engaged with said base on an outside surface of said base.

17. The camera bracket of claim 1 wherein said second end of each of said support and said link are engaged with said base internally of said base through an opening in said base, said opening in said base being sufficiently wide to receive through it at least that portion of the mount whereon said first end of said link is rotationally engaged with said mount and being sufficiently deep to receive said support.

18. The camera bracket of claim 2 wherein said second end of each of said support and said link being engaged with said base internally of said base through an opening in said base, said opening in said base being sufficiently wide to receive through it at least that portion of the mount whereon said first end of said link is rotationally engaged with said mount and being sufficiently deep to receive said support.

19. A camera bracket comprising:

a vertical base member, a rotatable support member and a rotatable link member both of which can assume a horizontal and vertical position, the link being rotationally engaged near a first end to a member on which a camera can be mounted and rotationally engaged near a second end to said base, said support being engaged near a first end in fixed position to said mount and near a second end both rotationally and slideably engaged with said base, said second end of said support being slideably engaged with said base by virtue of engagement of a first element with a groove in said base extending vertically of said base, and said second end of said link being rotationally engaged with said base through a second element associated with said first element, said support being parallel to said second link when in both the horizontal position and the vertical position, the distance between said support and said link being the same when support and said link are disposed in both the horizontal and the vertical positions, each of said support and said link being equally adjustable in length, said link being attached to the base at a point distal from and below the point of engagement of said support to the base by distances that cause an imaginary line projected through said point of attachment of said link and said base such as to form a 45 degree angle when said link and said base are in a horizontal position, said mount having a point of attachment for a camera vertically coincident with said point of attachment of said link to said mount, whereby the center point of said lens of the said camera coincides with said imaginary line upon appropriate adjustment of said length of said link and said support, said groove being of sufficient length that a each of said link and said support may be disposed in a vertical position, whereby there exists a camera mount which disposes a camera lens in the exact same position when said camera and said mount are in a vertical position and in a horizontal position.

* * * * *